Figure 1:
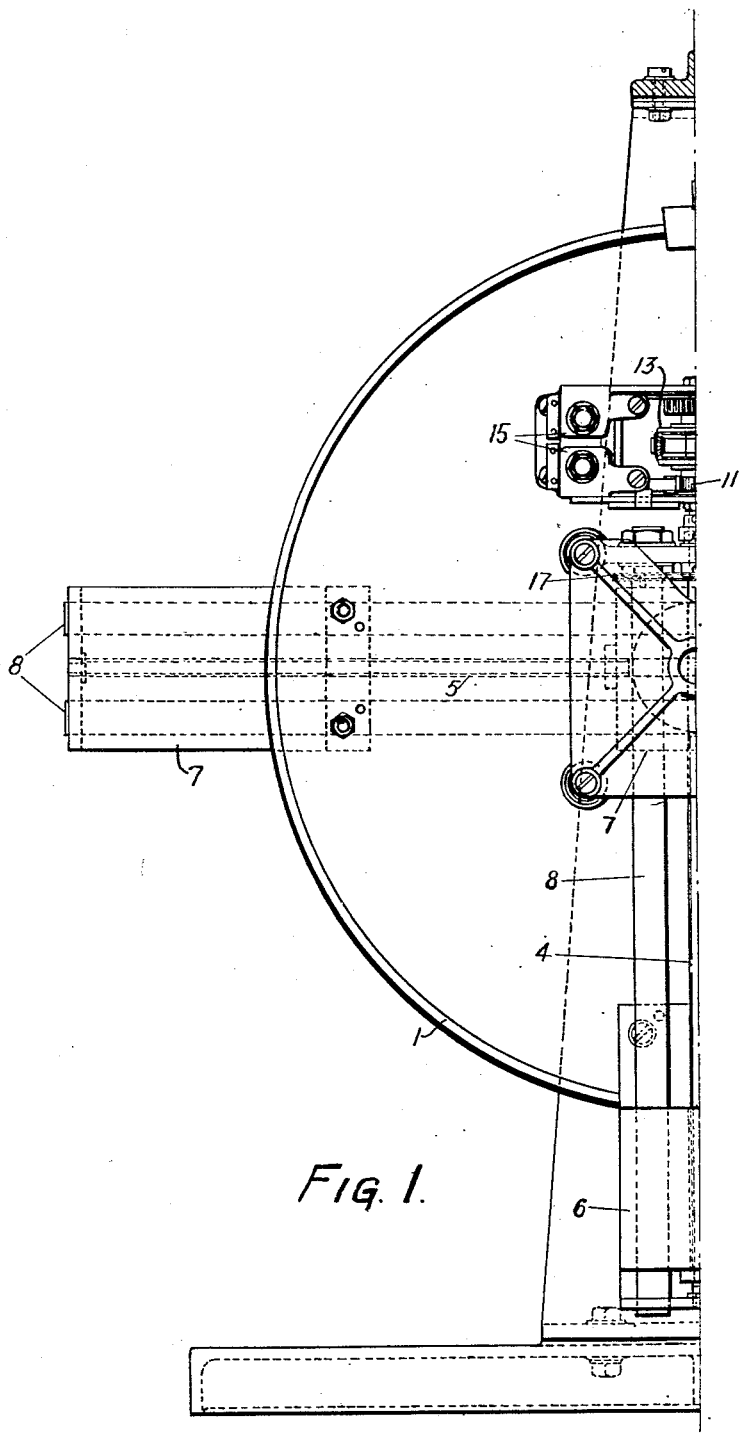

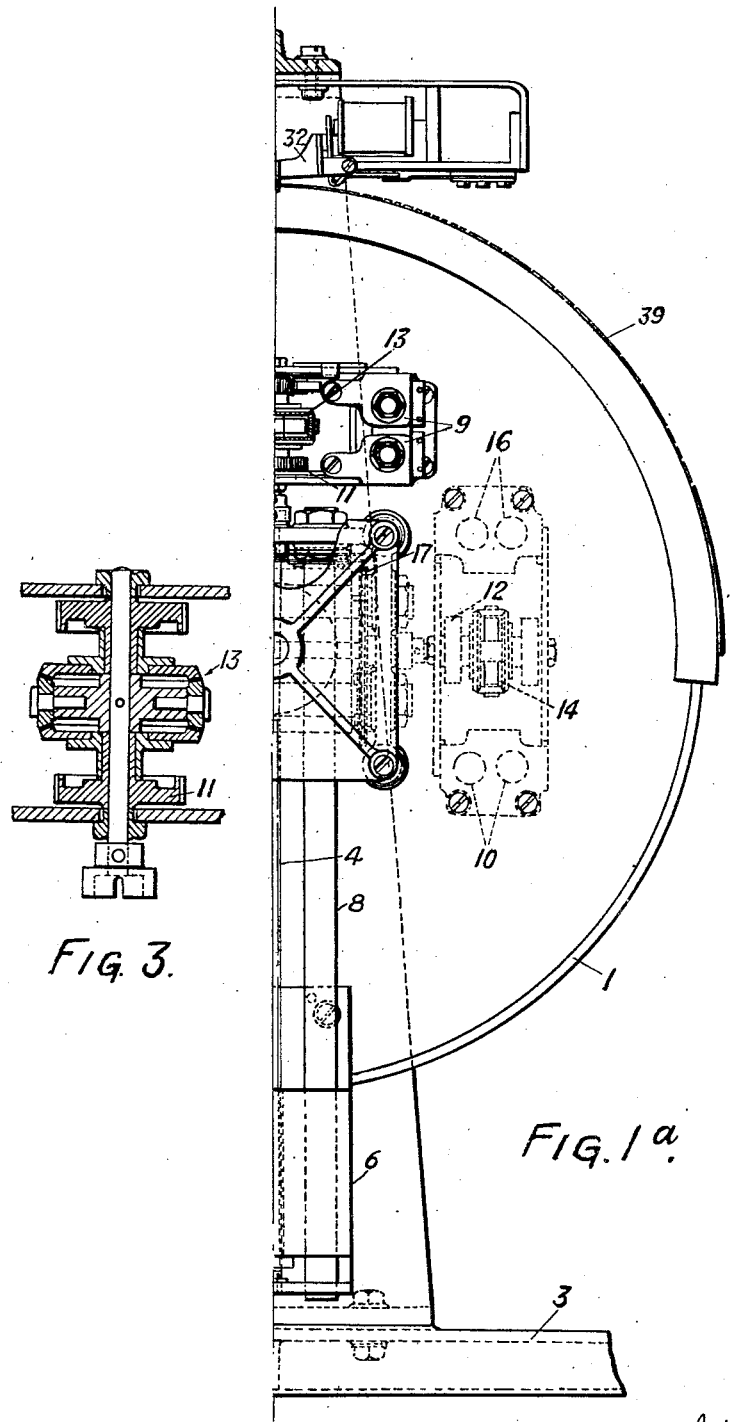

Dec. 25, 1951  J. HANDLEY  2,580,090
RATIO COMPUTING AND INDICATING
DEVICE FOR TOTALIZATORS
Filed March 30, 1948  7 Sheets-Sheet 4

FIG. 2ª

Inventor:
John Handley
by
Pennie, Edmonds, Morton and Barrows
Attorneys

Dec. 25, 1951   J. HANDLEY   2,580,090
RATIO COMPUTING AND INDICATING
DEVICE FOR TOTALIZATORS
Filed March 30, 1948   7 Sheets-Sheet 6

Inventor:
John Handley
by
Pennie, Edmonds, Morton and Barrows
Attorneys

Patented Dec. 25, 1951

2,580,090

UNITED STATES PATENT OFFICE 2,580,090

RATIO COMPUTING AND INDICATING DEVICE FOR TOTALIZATORS

John Handley, Purley, England, assignor to The Union Totalisator Company Limited, Glasgow, Scotland, a company of Great Britain and Northern Ireland Application March 30, 1948, Serial No. 17,978
In Great Britain September 16, 1946

3 Claims. (Cl. 235—61)

The invention concerns devices for computing the ratio of the value of amounts counted on a competitor counter to the total value counted by the total counter of a totalisator.

A device according to the invention consists of a pivotal framework mounted on frictionless bearings in a horizontal plane. Two lead-screws are housed in the frame, crossing the central axis and at 90° to one another and at 90° to the centre line of the bearings.

Two weights of equal value are traversed (one on each lead-screw) from a central point, outwards from the axis of the framework, respectively by means actuated by electrical impulses transmitted from the competitor and grand total counters of the totalisator. As these weights move outwards by varying amounts the whole framework rotates to keep the system in balance.

The impulses are received by an electro-magnet associated with each lead-screw and operating a ratchet wheel and gearing, so that each time an impulse is received the lead-screw is rotated slightly to adjust the position of the weight.

For the purpose of resetting the weights to their central position, after a race has been run, in preparation for the next race, another electro-magnet is used for each lead-screw and this rotates the screw in the reverse direction until the respective weight has been fully returned to the central position when it may prevent further operation of the "reset" magnet by breaking a pair of contacts in the reset circuit.

A differential gear is incorporated between these drives. As all the magnets are mounted on the moving framework, light springs on the pivotal members are used to pick up the operating leads, and, to prevent these from interfering with the correct balance of the system, snail cams over which is suspended a small weight on a thread are provided to compensate the torsional effort of the light springs.

The means for indicating the odds may comprise a pointer rotated with the pivoted framework over a dial behind the pointer as in U. S. Patent No. 2,229,737, or by electrical means of the type disclosed in said patent, or in British Patent No. 441,063, as modified by the electrical arrangement briefly described hereinafter.

Figure 2:
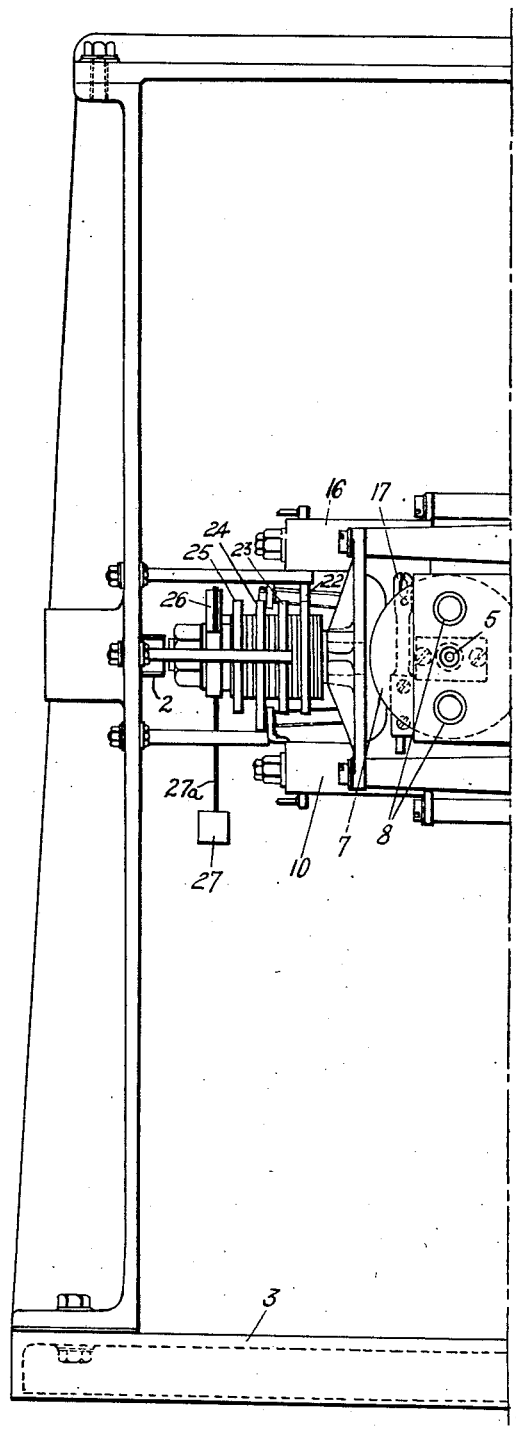
Figure 3:
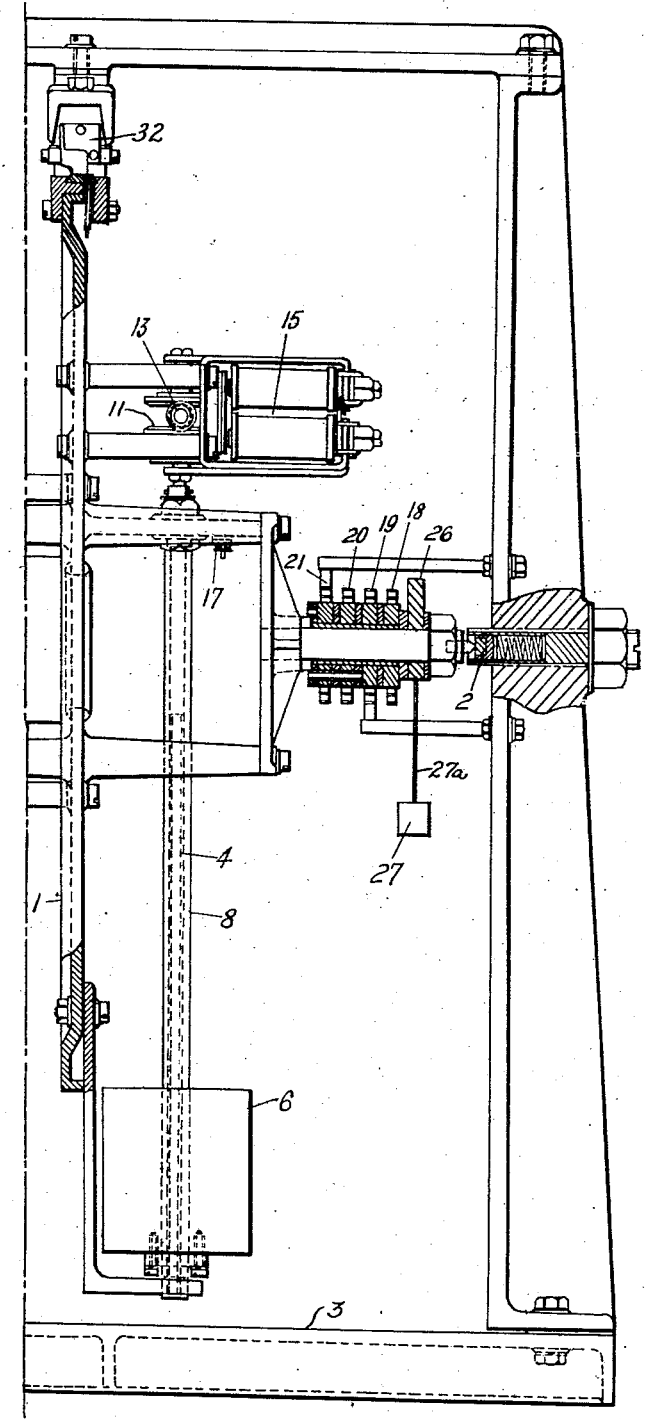
Figure 4:
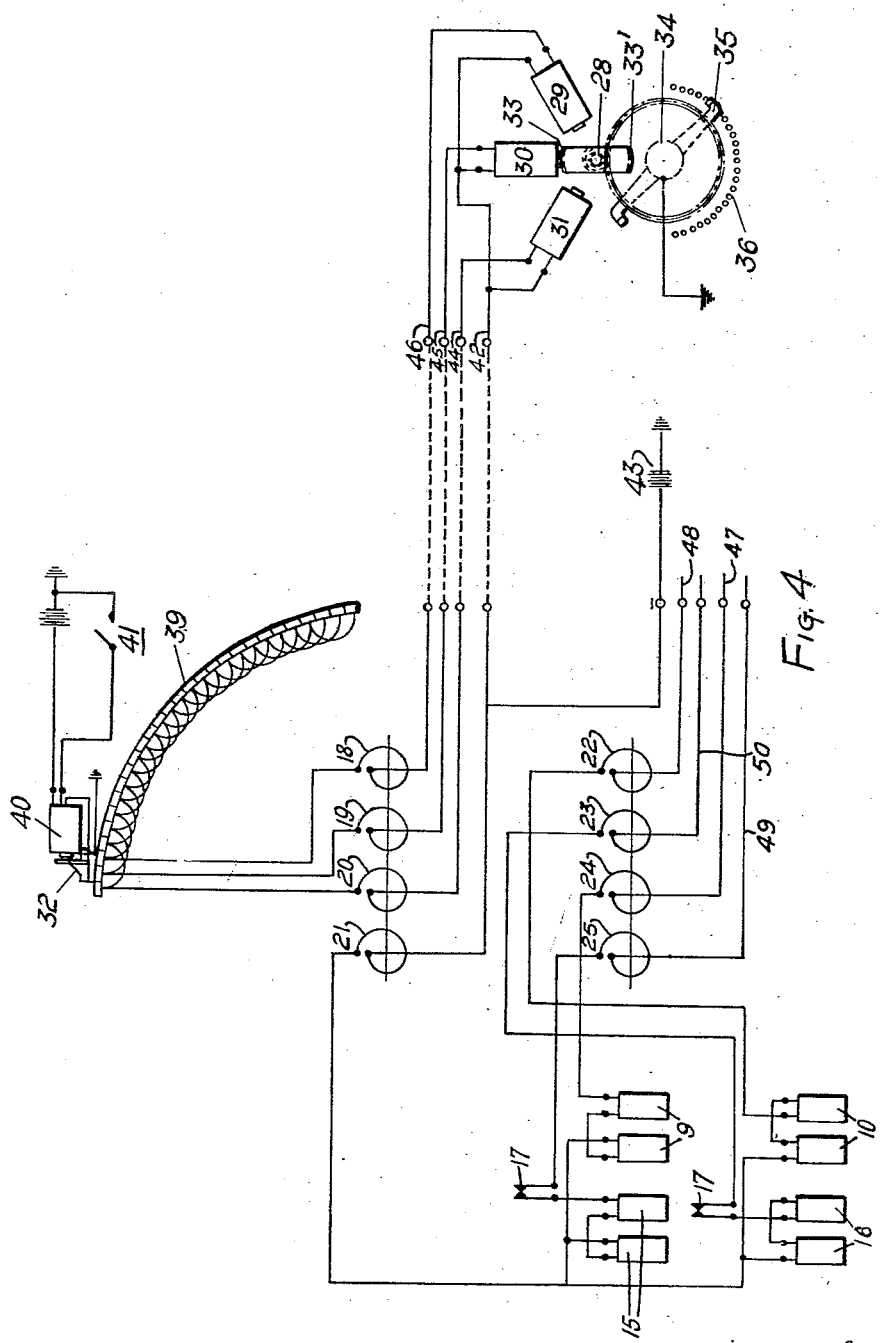
Figure 5:
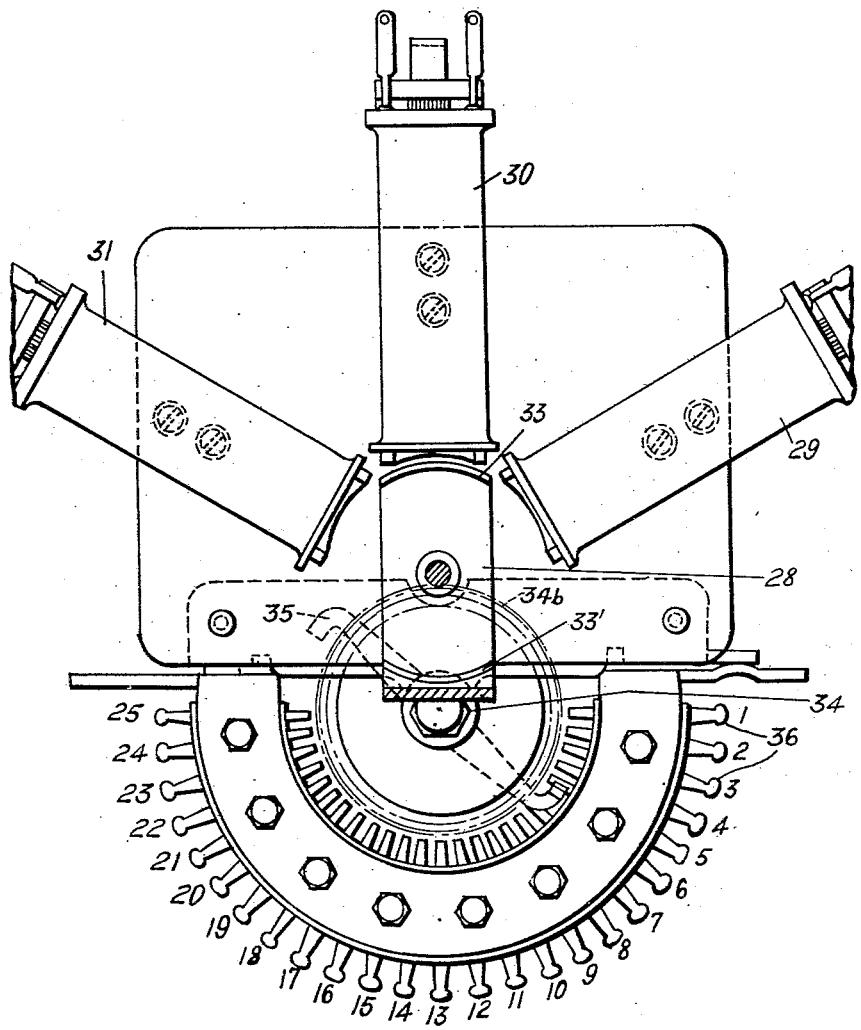
Figure 6:
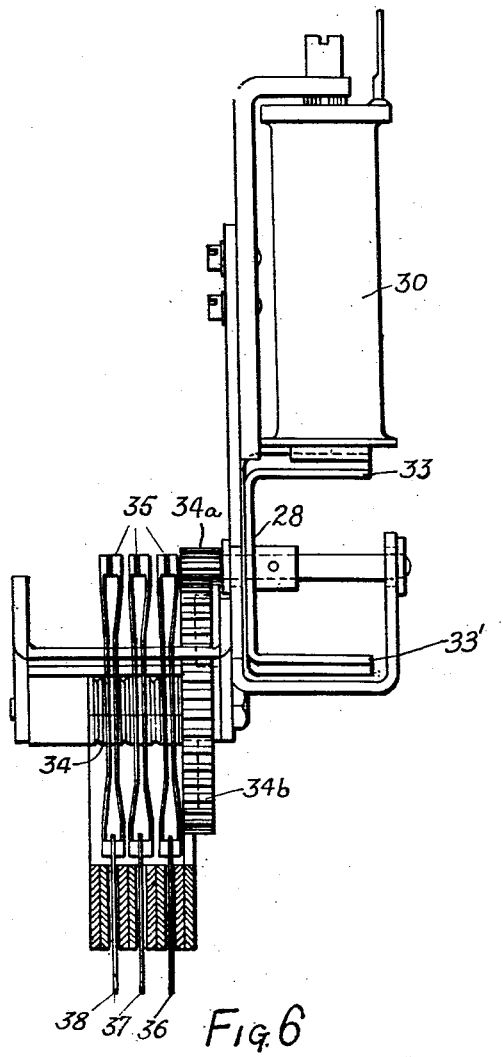

A ratio computing device according to the invention is illustrated in the accompanying drawings in which Figs. 1 and 1a together constitute an end elevation; Figs. 2 and 2a together constitute a side elevation; Fig. 3 is a detail view of a differential gear; Fig. 4 is a circuit diagram. Figs. 5 and 6 are elevations at right angles to one another of one form of means for indicating the odds.

Referring to Figs. 1–4 of the drawings, 1 is the movable framework mounted on pivot bearings 2, spring loaded to prevent damage by shock. For transit, means may be provided to clamp the movable framework temporarily to an outer frame 3.

Two lead-screws 4 and 5 are housed in the framework 1, crossing the central axis at 90°.

Two weights 6 and 7 are traversed or moved radially outwards of the framework by rotation of the lead-screws and are supported also on guide tubes 8.

The lead-screws are rotated by operation of electro-magnets 9 and 10 which receive respectively impulses from the competitor counter and the grand total counter of the totalisator, and impart small movements via ratchet wheels 11 and 12 and differential gears 13 and 14 to the lead screws 4, 5, generally moving the weights outwards from their central position in relation to the number of impulses received by each magnet.

To obtain a better average position for the weights 6, 7, and to save crowding the odds excessively at one end of the scale, the lead-screw 4 which takes the impulses from the competitor counter has a coarse thread, actually five times as coarse as the lead-screw 5 operated by the magnet 10. Thus, when the odds are 5 to 1, both weights will be at the same distance from the centre and the system will be in balance when the lead-screws are both at 45° to the vertical.

Then, if the ratios of numbers of impulses were 1 to 1, the positions would be 1–5 and the weights would swing the system round until in balance when (from the tangent of the ratios 1/5 or .2) the angle of one lead-screw is found to be 11° 18' and the angle of the other is 90° minus 11° 18' to the vertical.

When the ratios are 25–1, the positions are 5–1 when in balance, and the angles are 90° minus 11° 18' and 11° 18' so that all ratios between 1 to 1 and 25 to 1 are contained in a setting which does not drop below an 11° angle and can therefore be demonstrated with reasonable accuracy.

For the purpose of resetting the weights to their central positions, after the race has been run, in preparation for the next race, other electromagnets 15 and 16 are used for the respective lead-screws, and these bring about rotation of the screws in the reverse direction when impulses are sent to them via contacts 17, until the weights are returned to the central position, when the weights open the contacts and prevent further impulses from having access to the magnets.

The contacts 17 are normally closed and the impulses sent to them and to the magnets 15 and 16 return the weights 6 and 7 to their central position. When fully restored, the weights engage and open the contacts so that subsequent impulses are ineffective.

Since the magnets are mounted on the movable framework, light springs 18 to 25 bearing on collector rings mounted on the end pivot shafts carrying the movable framework 1, as shown in Fig. 2a, are used to pick up the operating leads. The springs 18 to 20 are used in conjunction with the means hereinafter described for indicating the odds. To prevent the springs 18 to 25 from interfering with the correct balance of the system, snail cams 26 over which weights 27 are suspended by threads 27a, are provided to compensate for the torsion of the light springs.

These snail cams 26, by virtue of their shape, are adapted to cause the weights 27 to act at a greater radius from the axis of rotation of the system as the springs 18 to 25 increase their torsional effort, and thus fully compensate for the effect of the springs on the system.

Fig. 4 of the drawings shows the wiring arrangement for operating electromagnets 9 and 10 by electric impulses received from the competitor and grand total counters of the totalisator, and the reset electromagnets 15 and 16. Fig. 4 also shows the wiring arrangement for one form of mechanism responsive to the ratio computing system for sending electrical impulses to operate a distant indicator of the type referred to in the above-mentioned patents. In Figs. 4, 5 and 6, 28 denotes a controlling rotor, 29, 30 and 31 electro-magnets, earthed in turn via the springs 18, 19 and 20, and a wiper on an armature 32 of a relay 40.

The rotor 28 has two pole faces 33 and 33' which are attracted by the magnets and rotate the line switch rotor 34, by the gears 34a and 34b shown in Fig. 6, moving wipers 35 to one contact after another of rows of contacts 36, 37 and 38, as the segments 39 on the computing device are earthed by the wiper on the armature 32. The segments 39 are insulated commutator segments carried on the periphery of the moving framework 1, these segments being multiplied 1, 4, 7, etc., 2, 5, 8, etc., 3, 6, 9, etc., and arranged to be grounded in turn by the wiper on the armature 32 controlled by the relay 40.

The contacts 36, 37 and 38 are wired to the correct markings on the switch elements of the display panels, so that the panels hunt to, and display, the required numerals.

As an example, if the first indication is to be 2 to 1, the first contact on row 36 will be wired to 1 on the first panel, and the first contact on row 37 will be wired to 2 on the second panel, and the first contact on row 38 will be wired to blank on the third panel.

If the tenth indication is 18 to 1, the tenth contact on row 36 will connect 1 on the first panel, the tenth contact on row 37 will connect 8 on the second panel, and the tenth contact on row 38 will connect 1 on the third panel, and so on.

The relay 40 is continually pulsed by contacts 41 on a pulsing relay not shown.

The common battery lead 42 is fed to all the apparatus from battery 43. Leads 44, 45 and 46 are the controlling wires for the rotor 28 and are individual to each marking switch.

The battery 43 shown in Fig. 4 supplies current through the spring connection 21 to the electromagnets 9, 10, 15 and 16. The respective pairs of these electromagnets are shown as mounted in series. The electromagnets 9 and 10 are respectively connected through spring connections 24 and 22 and leads 47 and 48 to the competitor and grand total counters and receive impulses therefrom when their circuits are closed. The electromagnets 15 and 16 are connected to ground through spring connections 25 and 23, leads 49 and 50, and a switch (not shown). After the competitor has completed a race, and it is desired to reset the ratio computing system, the operator simply actuates the switch connected into lines 49 and 50, or switches if desired, thereby actuating the electromagnets 15 and 16 to return the weights to their initial positions.

The illustrated form of mechanism for actuating a distant indicator described above forms no part of the present invention.

What is claimed is:

1. In a device for computing the ratio of the value of the amounts counted by a competitor counter to the value counted by the total counter of a totalisator, a framework pivoted for rotation about a horizontal axis, a pair of guides extending radially with respect to the axis of the framework in directions transverse to one another, a weight movable along each guide, means for moving said weights outwardly along said guides through distances corresponding respectively to the amounts counted on said counters, whereby the ratio of the movement of one weight to the movement of the other is described by the angular position assumed by the framework when it has rotated until balanced.

2. A ratio computing device as claimed in claim 1, in which said means comprises, a lead-screw engaging each weight, a differential gear engaging each screw, an electromagnet operatively connected with each side of each differential gear, and means including electrical conductors for energizing each electromagnet.

3. A device as claimed in claim 2, in which the means for energizing each electromagnet includes a collector ring mounted axially of the axis of rotation of the framework, a light contact spring engaging said ring, a snail cam rotatable with the framework, and a weight carried by a thread extending over said cam to compensate for the torsion of the spring.

JOHN HANDLEY.

REFERENCES CITED

The following references are of record in the file of this patent:

UNITED STATES PATENTS

| Number | Name | Date |
|---|---|---|
| 1,779,774 | Julius et al. | Oct. 28, 1930 |
| 1,992,957 | Julius et al. | Aug. 15, 1933 |
| 2,229,737 | Handley | Jan. 28, 1941 |